Jan. 2, 1951            A. MEGIÈS            2,536,511

EXTENSION TABLE WITH FLEXIBLE TOP

Filed June 27, 1946            10 Sheets—Sheet 1

Inventor
ARTUR MEGIES
By Haseltine Lake & Co.
Attorneys

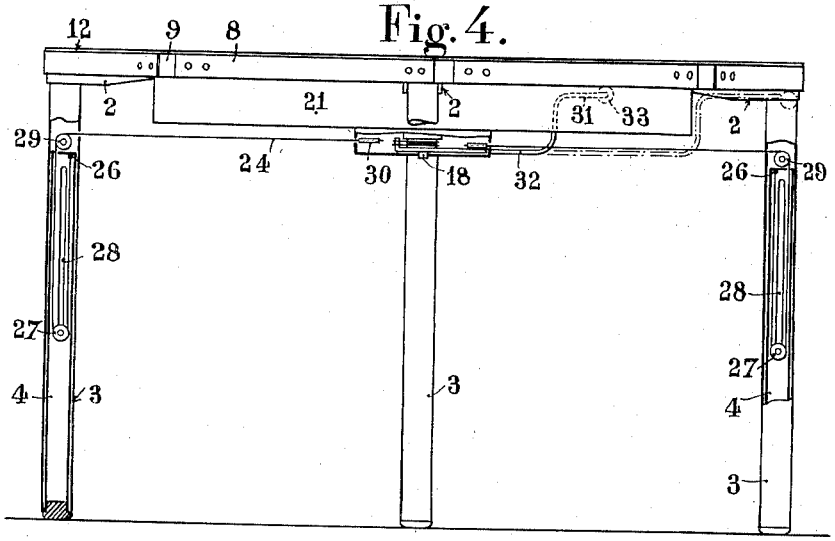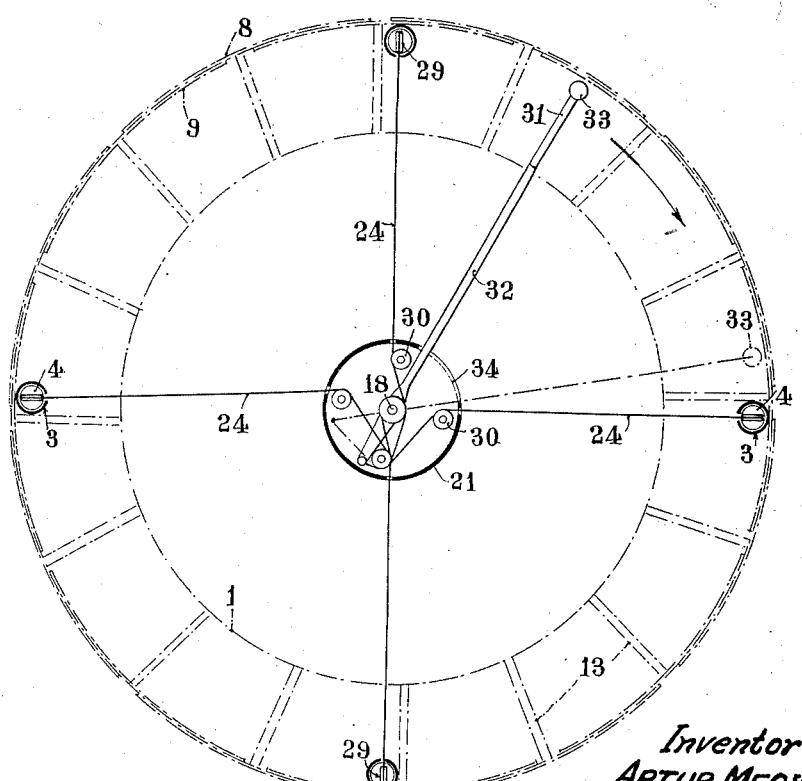

Jan. 2, 1951 A. MEGIÈS 2,536,511
EXTENSION TABLE WITH FLEXIBLE TOP
Filed June 27, 1946 10 Sheets-Sheet 3

Inventor
ARTUR MEGIES
By Haseltine, Lake & Co.
Attorneys

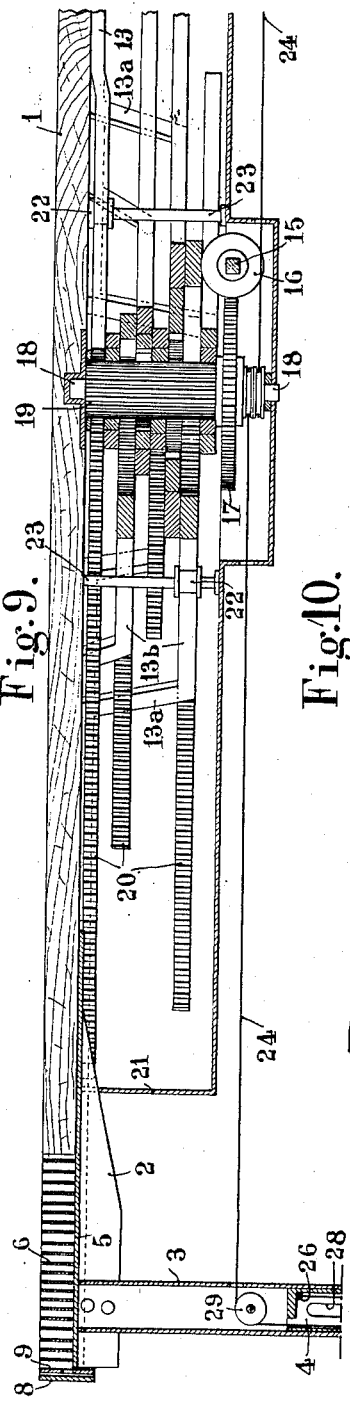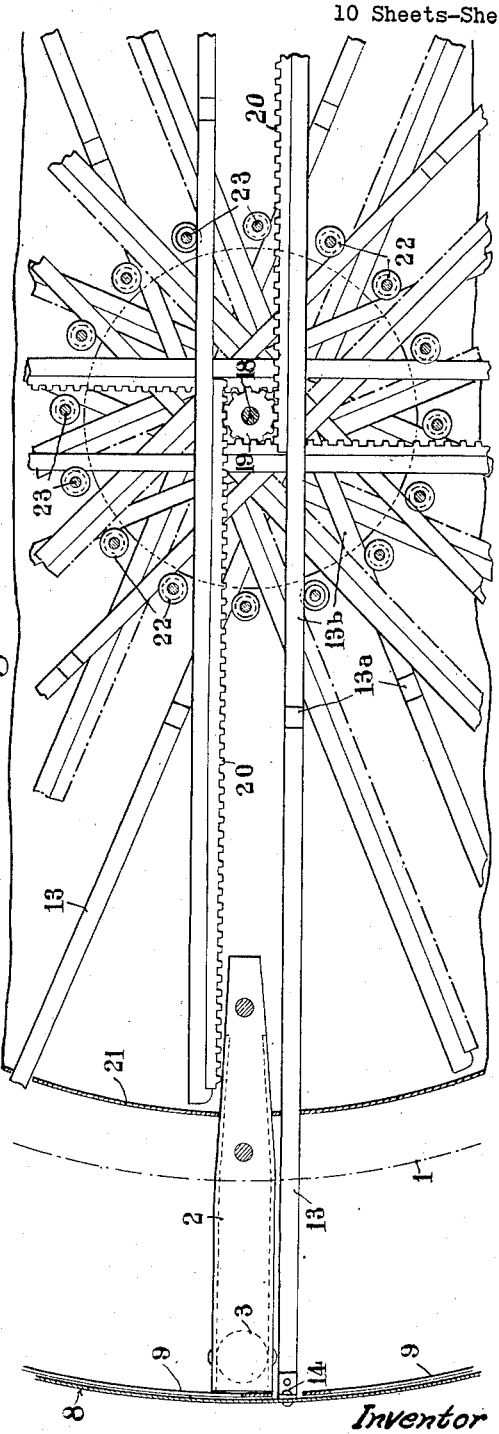

Jan. 2, 1951 A. MEGIÈS 2,536,511
EXTENSION TABLE WITH FLEXIBLE TOP
Filed June 27, 1946 10 Sheets-Sheet 5

Inventor
ARTUR MEGIES
By Haseltine, Lake & Co.
Attorneys

Jan. 2, 1951  A. MEGIÈS  2,536,511
EXTENSION TABLE WITH FLEXIBLE TOP
Filed June 27, 1946  10 Sheets-Sheet 6
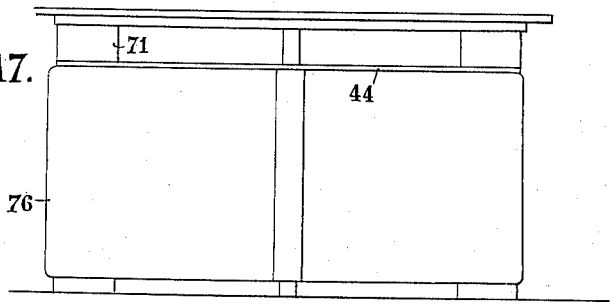
Fig. 17.
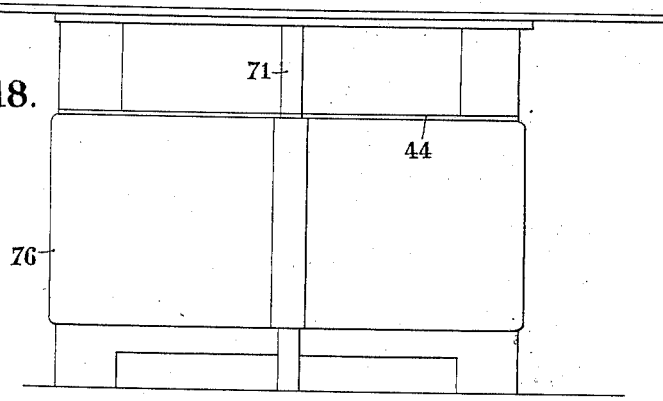
Fig. 18.
Fig. 21.
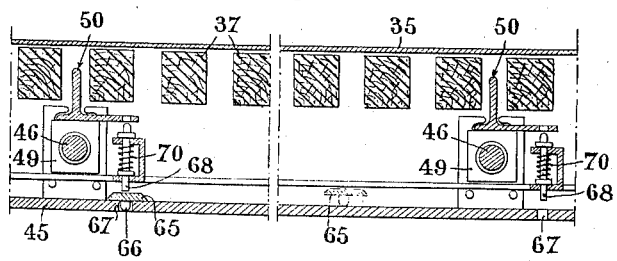
Fig. 22.
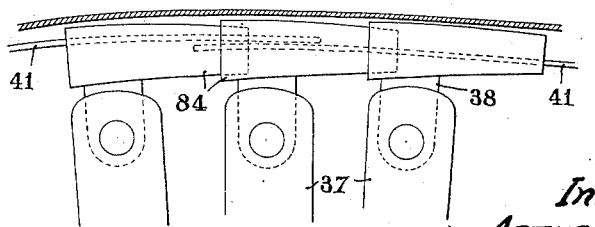
Inventor
ARTUR MEGIÈS
By Haseltine, Lake & Co.
Attorneys

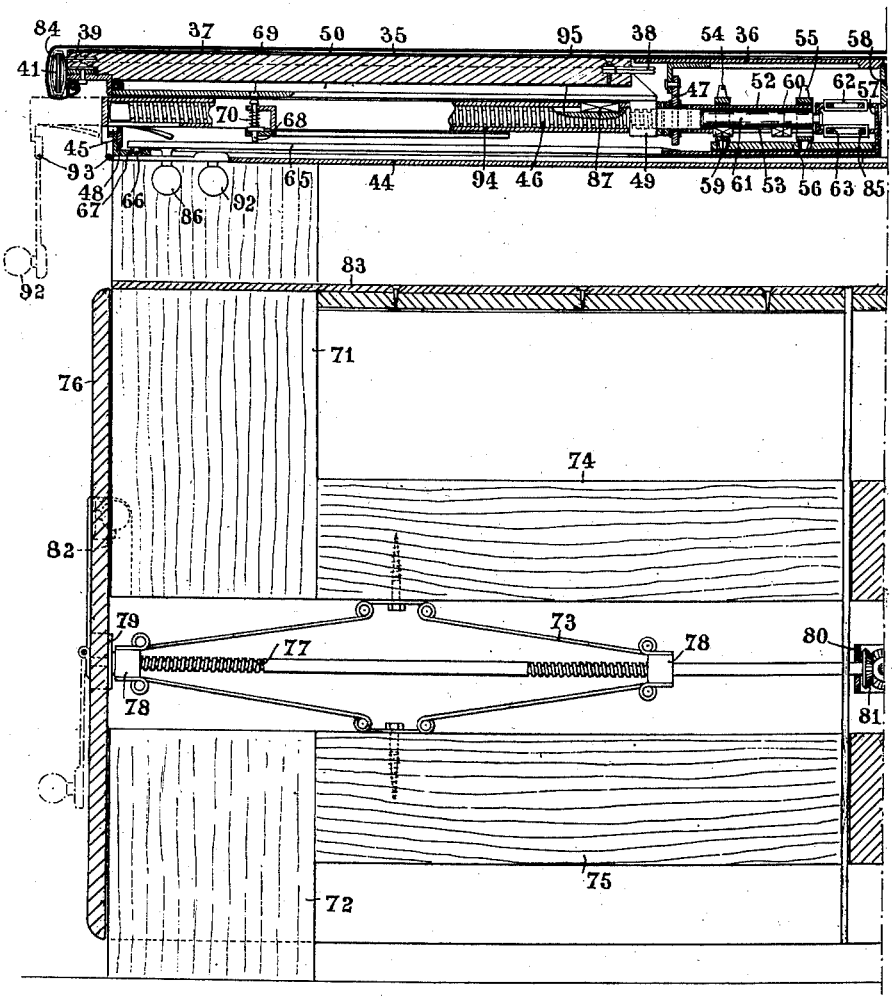

Jan. 2, 1951  A. MEGIÈS  2,536,511
EXTENSION TABLE WITH FLEXIBLE TOP
Filed June 27, 1946  10 Sheets-Sheet 8

INVENTOR:
ARTUR MEGIES
BY:
Haseltine, Lake & Co.
AGENTS

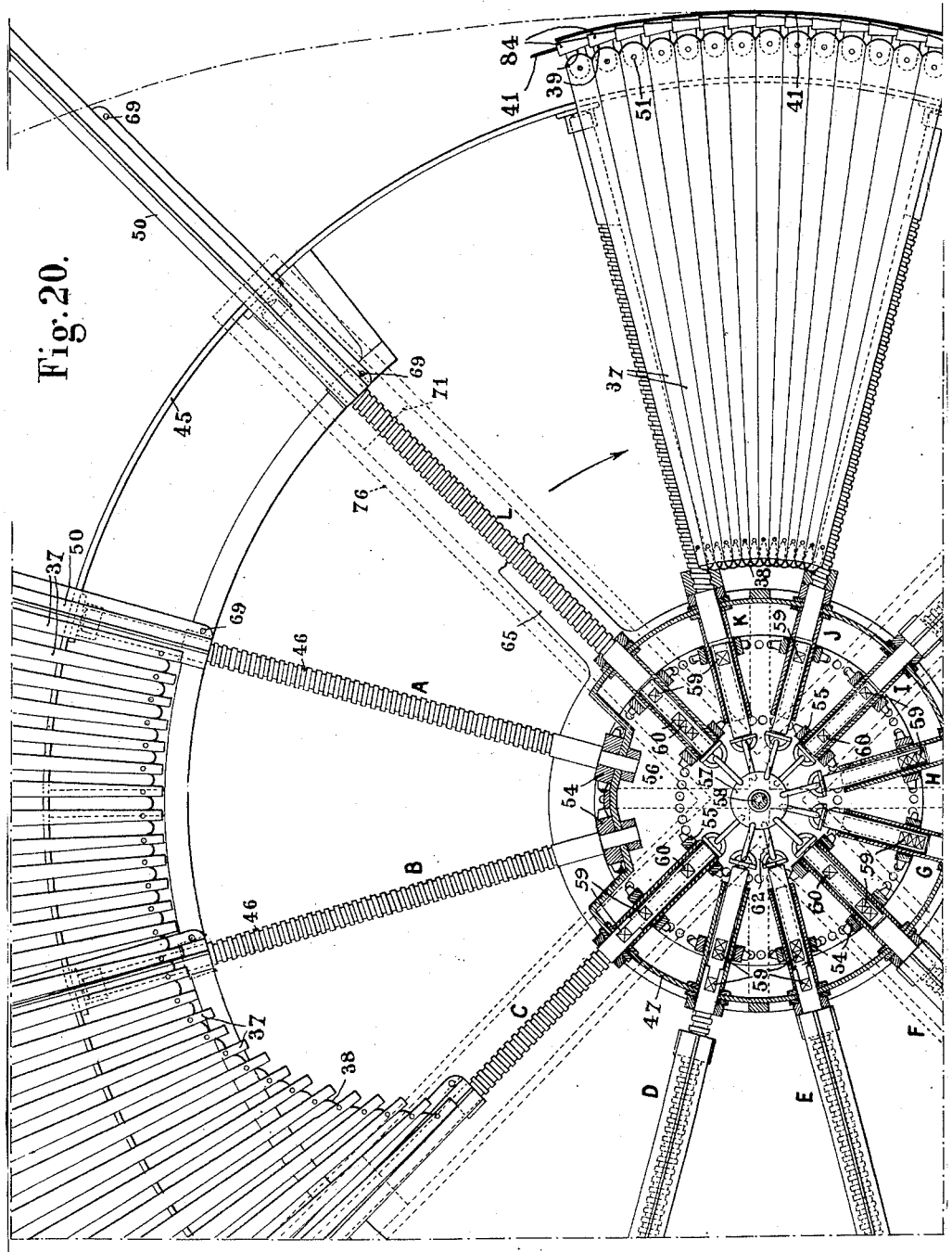

Jan. 2, 1951      A. MEGIÈS      2,536,511
EXTENSION TABLE WITH FLEXIBLE TOP
Filed June 27, 1946      10 Sheets-Sheet 10
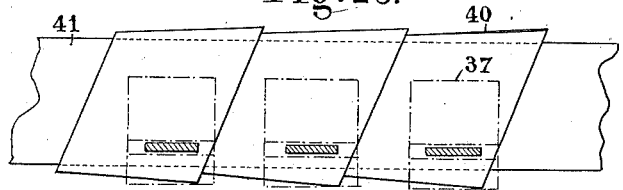
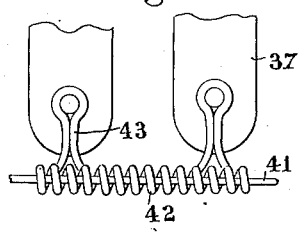 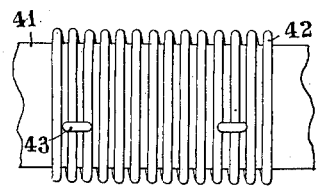
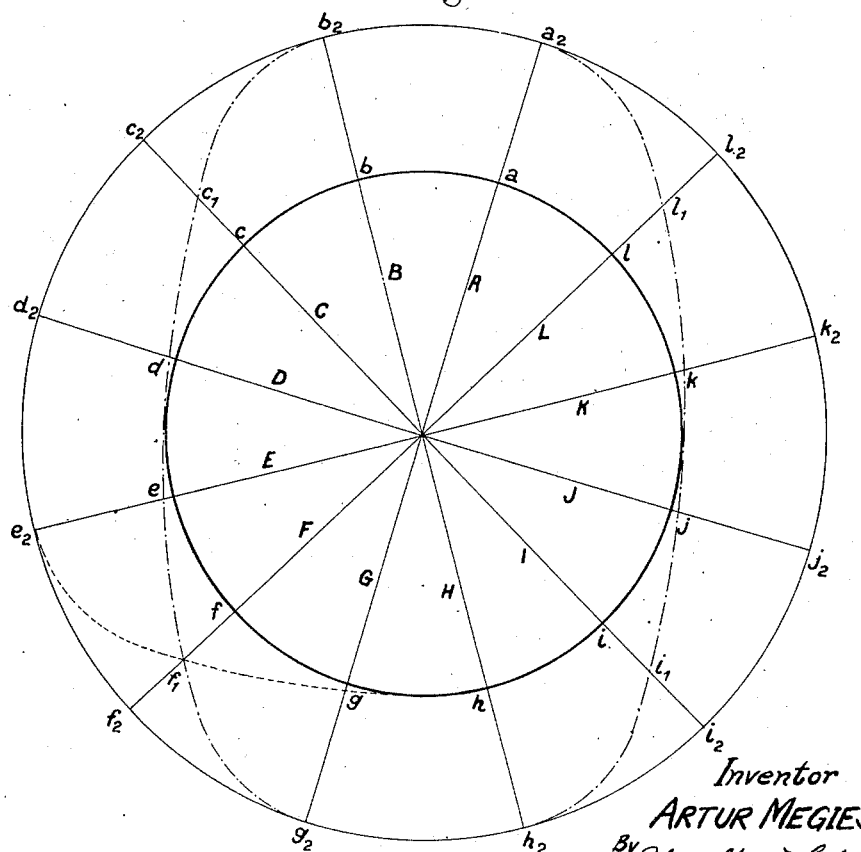
Inventor
ARTUR MEGIES
By Haseltine, Lake & Co.
Attorneys Patented Jan. 2, 1951

2,536,511

UNITED STATES PATENT OFFICE 2,536,511

EXTENSION TABLE WITH FLEXIBLE TOP

Artur Megiès, Paris, France

Application June 27, 1946, Serial No. 679,795
In France February 7, 1939

Section 1, Public Law 690, August 8, 1946
Patent expires February 7, 1959

4 Claims. (Cl. 311—53)

This invention relates to a table having an extensible top, to which various forms and dimensions may be given, and wherein the table top in changing from a given form and set of dimensions to another form and set of dimensions passes continuously through the intermediate forms and dimensions.

A table constructed according to the invention includes a rigid central top portion supported by legs, which may be adjustable to vary the height of the table top, and an outer top portion formed of radially movable elements surrounding the rigid central portion and so constructed as to permit varying of the form and dimensions of the periphery of the table top.

An object of this invention is to provide a table of the character described including mechanical means for varying the form and dimensions of the marginal edges of the top thereof.

A further object is to provide an extensible table of the type described including a top formed of an indeformable central portion and an annular portion surrounding the central portion formed of radially movable elements, and actuating means for the radially movable elements so constructed as to position the latter for obtaining a table top having any selected one of a plurality of varying forms and dimensions.

Other objects, features and advantages of the invention will appear in the following detailed description of preferred embodiments of the invention which are illustrated in the accompanying drawings.

In the drawings:

Figure 4 is a side elevational view, similar to that of Figure 1, with the telescoping legs retracted to lower the table top;

Figure 5 is a top plan view of the table, with the top thereof shown in broken lines, illustrating the control mechanism for raising and lowering the supporting legs;

Figure 9 is a fragmentary, vertical, sectional view of the table top, on an enlarged scale, showing the mechanism controlling the deformation of the table top;

Figure 10 is a fragmentary top plan view of the mechanism shown in Figure 9, the table top being removed;

Figure 17 is a side elevational view of a table constructed according to a modified embodiment of the invention, with the table top being shown in lowered position and retracted;

Figure 18 is a side elevational view similar to that of Figure 17, with the table top raised and extended;

Figure 19 is a vertical sectional view of a half of the table of Figure 17, on an enlarged scale, and with the top in lowered and retracted position;

Figure 20 is a fragmentary top plan view of the table of Figure 17, on an enlarged scale, and with the flexible cover removed;

Figure 21 is a detail vertical sectional view illustrating the safety device insuring the return of the table top to its circular form of minimum diameter prior to change in the shape thereof;

Figure 22 is a fragmentary, enlarged, top plan view of the elastic joint connecting the outer ends of the slidable rods forming the table top of the table of Figure 17;

Figure 23 is a view of a modified elastic joint;

Figures 24 and 25 are a plan view and a side elevational view, respectively, of still another elastic joint; and Figure 26 is a diagrammatic view illustrating various forms or shapes which can be given to the extensible table top.

Figure 1:
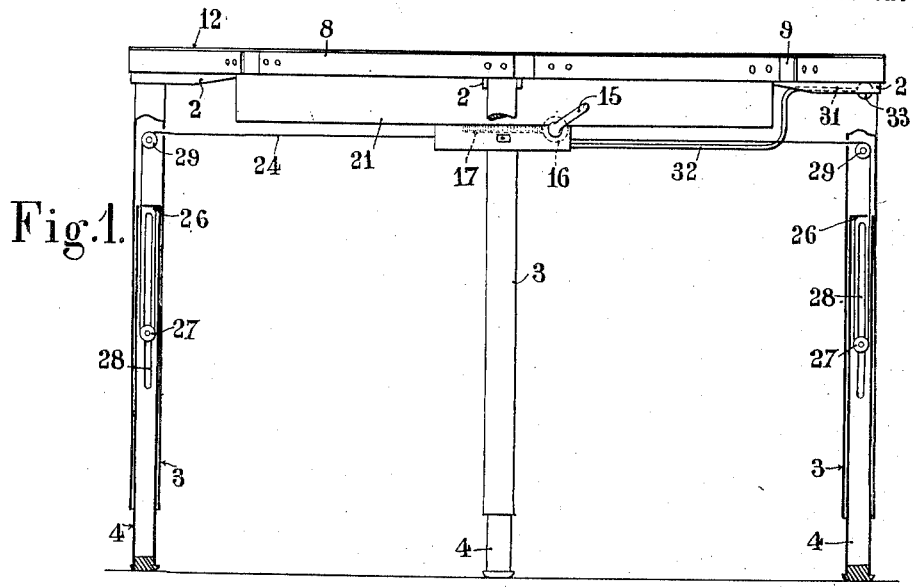
Figure 1 is a side elevational view of a table constructed according to the invention, with the top retracted and having a circular form, two of the supporting legs being broken away to show their internal structure, and with the legs in raised position.

Referring in detail to the drawings, and initially to Figures 1–16 thereof, a table constructed according to the invention is there illustrated. The table includes a top having a rigid central portion formed of a circular plate 1, of wood or other rigid material. Four equally spaced apart, radially extending arms 2, are fixed to the lower surface of plate 1 and extend outwardly beyond the periphery of the latter. A vertical, downwardly opening tubular member 3 is fixed, by suitable means, to the outer end of each of arms 2, and slidably receives a tubular elongated leg forming member 4. The tubular members 3 and 4 together constitute a telescopic leg, and a suitable plug, or other foot forming member is carried by the lower end of each of the tubular members 4. An annular flat sheet metal rim 5 (Fig. 9), is supported on the arms 2 and extends outwardly beyond the rigid center portion 1 to provide a supporting ledge, or surface, for the deformable portion of the table top, when the latter is contracted.

Figure 7:
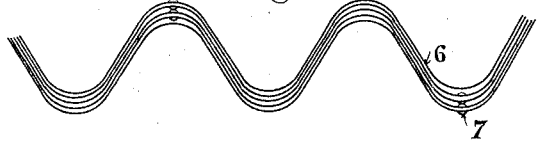
Figures 7 and 8 are top views of a portion of the deformable flexible members forming the table top surface in a retracted and expanded condition, respectively.
Figure 8:
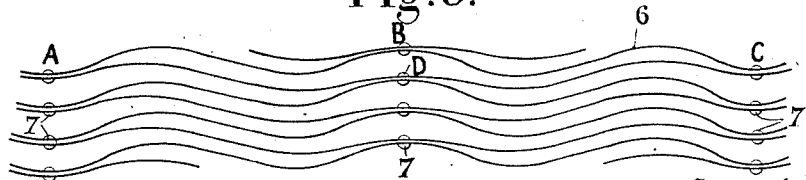
Figure 11:
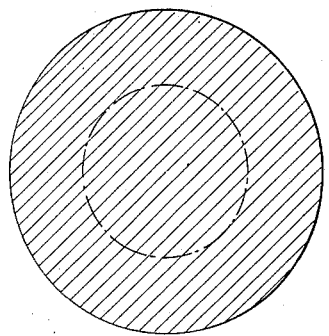
Figures 11–16 are diagrammatic representations of the various forms that can be given to the deformable outer portion forming the table top.
Figure 12:
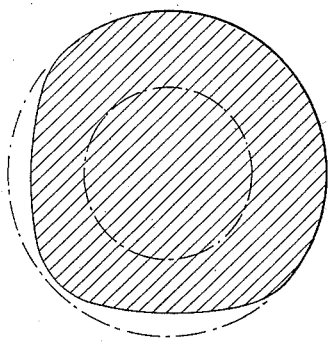
Figure 13:
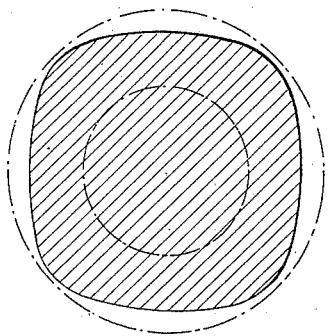
Figure 14:
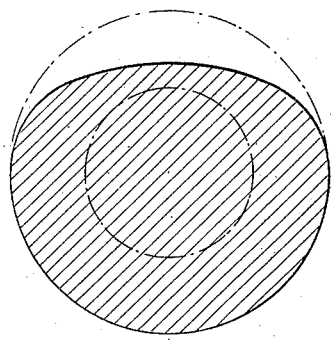
Figure 15:
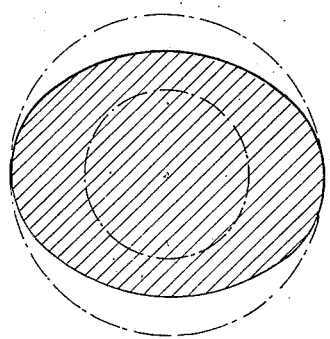
Figure 16:
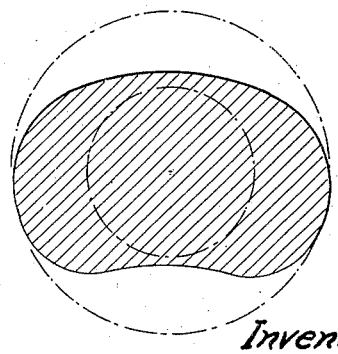

The deformable portion of the table top preferably includes a plurality of thin corrugated or undulating ribbons 6, formed of steel or any other similar resilient material, placed on edge and arranged concentrically. Each of the ribbons 6 is united to the ribbons disposed on the opposite sides thereof by spaced rivets 7 alternately securing each ribbon first to the adjacent ribbon on one side thereof and then to the adjacent ribbon on the other side thereof (Figure 8). The top edges of the ribbons 6 are coplanar and provide a substantially annular radially deformable surface about the central plate 1. When the deformable surface is contracted, that is the condition in which the circumference or perimeter is reduced to a minimum, each ribbon 6 will flex and the corrugations or undulations thereof will increase in depth while the spacing between the ribbons will decrease (Fig. 7). When the deformable portion of the table top is extended, or adjusted to a condition in which the perimeter is enlarged, the individual ribbons will flatten out, however, the spacing between the ribbons will continue to be substantially small (Fig. 8) to thereby provide a suitable table top.

The deformable portion of the table top is surrounded by an extensible frame, or girdle (Fig. 3), formed of a series of arcuate, elongated members 8 and 9 having suitable slidable connection with each other. Each of the arcuate members 8 and 9 is fixed at its center to the outermost one of the ribbons 6, and each of the members 9 is formed with a pair of elongated slots 11 extending from the center thereof toward the opposite ends. The members 8 are provided with pins or bolts 10 fixed at the opposite ends thereof, which slidably engage in the slots 11 of the members 9 between which members 8 are alternately disposed. The members 8 and 9 then form a continuous band, frame or girdle surrounding the periphery of the deformable portion of the table top and capable of being extended and retracted to vary the length and shape of such periphery.

The table top including the fixed or rigid central plate 1, the deformable portion formed of the ribbons 6, and the surrounding band or girdle formed of arcuate members 8 and 9 is covered by an elastic sheet 12 formed of any material having sufficient elasticity to conform to the various possible shapes and dimensions of the table top without forming folds or wrinkles.

The mechanism for contracting and extending the deformable portion of the table top, and for supporting the latter while in its extended condition includes a circular housing 21 fixed below central plate 1 and having a bottom wall and a cylindrical side wall. A vertical shaft 18 is disposed in the center of the housing 21 and rotatably journalled at its opposite ends in the plate 1 and a depressed portion of the bottom of housing 21. A plurality of circumferentially spaced openings are formed in the side wall of housing 21 immediately below plate 1, and a plurality of radially extending rods 13 extend slidably through these openings. Each of the rods 13 is formed with an outer horizontal portion located just below the bottom surface of plate 1, and extending through the housing side wall for attachment at its outer end to the center of one of the arcuate members 8 and 9 by a suitable bracket 14. That is, a rod 13 is provided for each of the arcuate members 8 and 9, and the outer portions of these rods underlie the ribbons 6, for supporting the latter, when the deformable portion of the table top is extended. Each of the rods 13 is downwardly offset, as at 13a, intermediate its length to provide a horizontal inner portion 13b which is spaced downwardly from the outer portion thereof. As seen in Fig. 9, the distance each of the several rods 13 is offset varies so that the inner ends 13b thereof may cross without interfering with each other. A plurality of vertical shafts 23, spaced equally from the central shaft 18, are fixed between the plate 1 and the bottom of housing 21, and groove rollers 22 are rotatably carried by shafts 23 at various heights for receiving the inner portions 13b of the respective rods. The rods 13 are thereby supported for radial movement by the openings in the housing side wall through which they slidably extend, and by the rollers 22.

Figure 2:
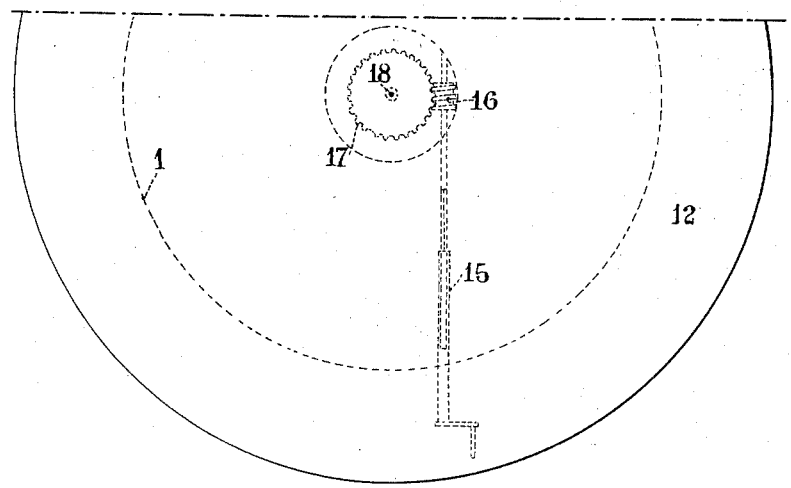
Figure 2 is a fragmentary top plan view of the table top of Figure 1.
Figure 3:
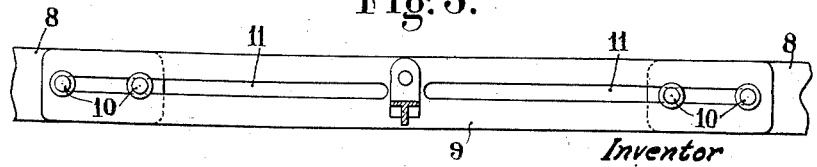
Figure 3 is a detail view, on an enlarged scale, of a portion of the girdle or marginal edge structure of the top of the table in Figure 1.
Figure 6:
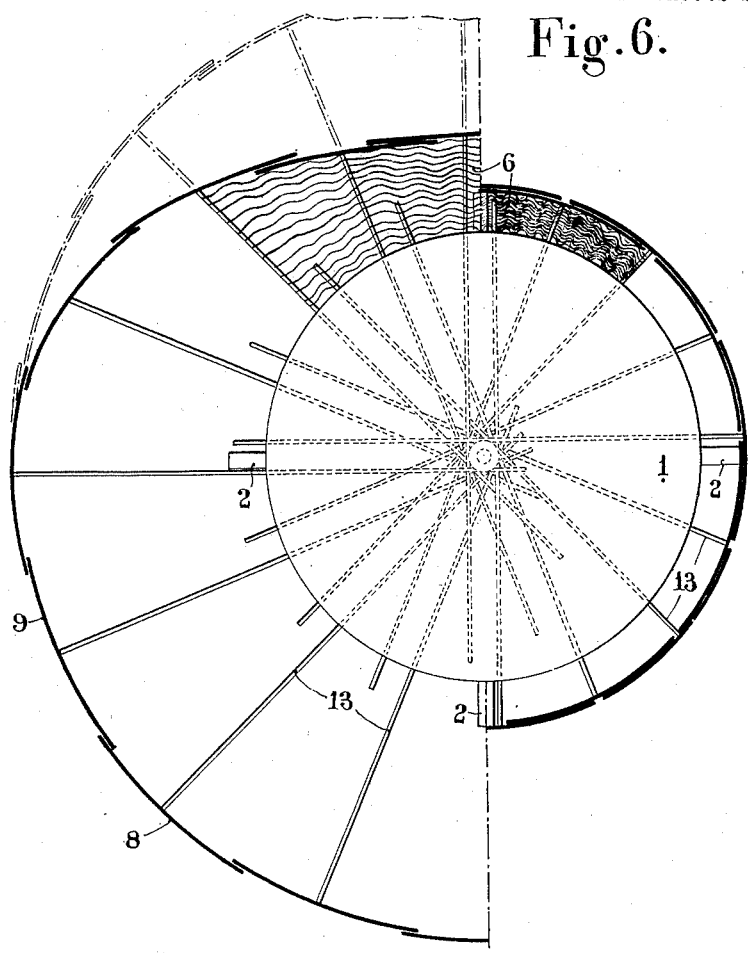
Figure 6 is a top plan view of the table top, with the top surface forming flexible members removed in part, and with one half of the top being reduced to the minimum diameter and the other half in a form which is partly elliptical and partly circular.

The adjustment of the form and dimensions of the deformable portion of the table top may be effected most simply by pushing or pulling upon the peripheral frame formed of relatively slidable members 8 and 9, however, it is desirable to provide a mechanical device for effecting such adjustment. A suitable mechanism for the purpose is illustrated in Figs. 2, 8 and 9, and includes a telescopic shaft 15 rotatable in housing 21 and extending outwardly therefrom to the edge of the table top. A crank handle is secured to the outer end of the telescopic shaft 15, and the latter may be extended and retracted manually to maintain the handle in a convenient position relative to the edge of the table top as the form and dimensions of the latter are varied. A worm 16 is fixed on the inner end of shaft 15 and meshes with a worm wheel 17 fixed upon central shaft 18. An elongated pinion 19 is also fixed on shaft 18, being above worm wheel 17, and rotates with the latter. In the illustrated form of the invention, the pinion 19 meshes with gear racks 20 which extend along, and are fixed to, the inner portions 13b of the respective rods. As seen in Fig. 10, the gear racks on the rods extending in diametrically opposite directions confront each other, and mesh with pinion 19 at points which are at opposite sides of the latter. Thereby, rotation of shaft 15 by hand manipulation of the crank thereon, effects simultaneous movement of the outer portions of the several rods 13 either outwardly or inwardly with respect to central plate 1, depending upon the direction of rotation of shaft 15. Since the outer ends of rods 13 are secured to members 8 and 9 forming the peripheral frame, and since these members are in turn secured to the outermost of the joined ribbons 6, radial movement of rods 13 will result in the extension and contraction of the deformable portion of the table top. When the racks 20 are fixedly mounted on the rods 13, as in the illustrated embodiment, each of the rods will move the identical distance radially, and if the racks are initially disposed to provide a circular perimeter to the table top the movement of the rods will merely vary the diameter of such circular form. However, by initially disposing the racks 20 at varying positions along the lengths of the inner portions 13b of the rods, any other form may be given to the table top, for example an elliptical form, and the movements of the rods by rotation of pinion 19 will result in a change in the dimensions of this initial form while retaining a similar shape.

Where it is desired to change the shape of the table top, as well as the dimensions thereof, in response to rotation of shaft 15, a plurality of pinions of varying diameter (not shown) may be substituted for the single pinion 19 of the illustrated device, so that the racks meshing with the pinions of different diameter, and the associated rods will be moved radially varying distances for each revolution of shaft 18 to which the pinions are fixed. In this latter form of the invention, the contour of the perimeter of the table top will vary as the deformable portion is enlarged and retracted.

Furthermore, it is possible to obtain various contours for the table top by substituting a plurality of pinions for the single pinion 19 of the illustrated device and by interposing suitable clutching means between each of the pinions and shaft 18, so that certain of the pinions may be selectively disengaged. With this construction, certain of the rods 13 may be moved outwardly or inwardly while others of the rods remain immobile to thereby make possible the realization of any desired contour.

The same result may be achieved by other non-illustrated contrivances, such as making the respective racks 20 longitudinally slidable relative to the inner portions 13b of the rods, and provided with locking means for selectively holding the racks fixed relative to the associated rods. Such locking means may be in the form of a set screw carried by either the rack or the rod and engaging against the other, or in the form of spaced recesses formed in the rack for receiving a movable latching member carried by the rod and actuated by hand or other suitable means.

In Figs. 1, 4, 5 and 9, a device is illustrated for varying the height of the table top by varying the telescoping of tubular members 3 and 4 forming each of the supporting legs. Each of the tubular members 4 is formed with a pair of diametrically opposed longitudinally extending slots 28 through which a horizontal shaft fixed in member 3 loosely extends. A pulley 27 is rotatable on this latter shaft. A second pulley 29 is rotatably carried by a horizontal shaft fixed across the upper portion of tubular member 3, and a flexible cable 24 extending radially from the housing 21 for each of the adjustable legs is trained over pulley 29, then downwardly into the leg and under pulley 27, and finally extends upwardly for attachment at 26 to the tubular member 4. The cables 24 at their inner ends pass around pulleys 30, rotatable about vertical axes within housing 21 (Fig. 5), about grooved pulleys rotatable on shaft 18, and finally attach to the end of lever 32 which is pivoted intermediate its length on shaft 18. The lever 32 extends radially outward through slot 34 formed in the housing 21, and is offset upwardly at its outer end as at 31 (Fig. 4) and provided with a suitable knob 33 at its outer end. It is apparent that when knob 33 is moved in the direction of the arrow of Fig. 5, the several cables 24 will be uniformly tensioned to move pulleys 27 upwardly towards the top ends of tubular members 4, thus effecting a lengthening of the legs and raising the table top. Suitable notches (not shown) may be provided in the edge of slot 34 for receiving lever 32 and retaining the latter in any of several angularly adjusted positions, to thereby retain the table top at the selected level.

Referring now to the embodiment of the invention illustrated in Figs. 17 to 26, the table there shown includes a table top formed of a circular disc or plate 44 having a pivot or bolt 58 extending upwardly from the center of the top surface thereof. A stiffening circular plate 36 is fixed on the top end bolt 58 and underlies the central portion of a relatively thin sheet metal disc 35. A plurality of radially extending and slidable rods 37 rectangular in cross-section underlie the thin disc 35 and are connected together at their inner ends by flexible strips 38 pivoted at their opposite ends to the inner ends of rods 37. An upstanding wall or flange 45 is secured to the periphery of disc 44 and the rods 37 slidably rest upon the top edge of wall 45. The outer ends of the rods 37 are inter-connected by a suitable flexible extensible structure, which in the form illustrated by Fig. 22, includes an open ended conical member 84 having an arm 38 extending from the side thereof which is pivotally connected to the outer end of each of the rods 37. The conical members 84 telescope into each other, and a plurality of elongated, flexible, curved strips 41, overlapping at their ends and slidable relative to each other, extend through the conical members 84.

In Fig. 23 a modified flexible and extensible structure for connecting the outer ends of rods 37 is shown. This modified structure includes the flexible, relatively slidable strips 41 described above and, in place of the conical members 84, a continuous coiled flat strip 40 is wrapped around the strips 41 and provided with radial lugs at suitable intervals for pivotal attachment to the ends of rods 37 similar to the arms 38 extending from members 84.

In Figs. 24 and 25 still another form of structure for connecting the outer ends of rods 37 is illustrated. This latter structure once again includes the flexible, relatively slidable strips 41, and a flat coiled spring member 42 extends about strips 41. The coiled spring member 42 is connected to the ends of rods 37 by the lugs or eyes 43 which extend from spring member 42 at suitable intervals and pivotally receive bolts extending through the outer ends of rods 37.

Figure 19A:
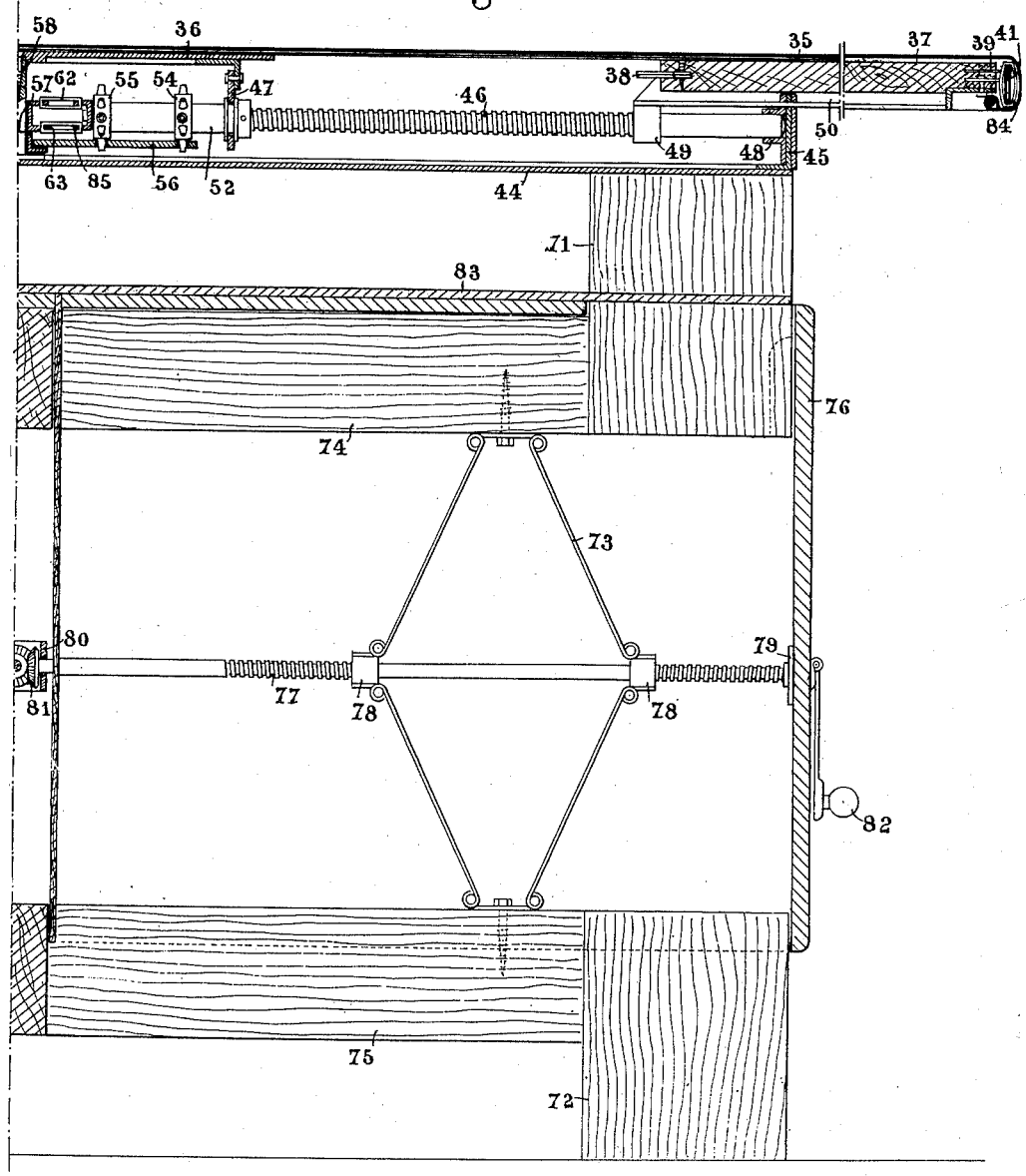
Figure 19a is a vertical sectional view, similar to that of Figure 19, but of the other half of the table, with the top raised and extended.

An elastic cover member, of substantial thickness, overlies the entire top structure and is drawn under the peripheral edge structure joining the outer ends of rods 37, as seen in Fig. 19a. The cover provides a smooth top surface when rods 37 are retracted under the metal disc 35 or when they are extended outwardly for increasing the area of the table top.

The mechanism for effecting radial movements of rods 37, and hence the changes of form and dimensions of the table top, is disposed in the space between the top discs 35 and 36, and the lower disc 44. This actuating mechanism comprises a plurality of angularly spaced, radially extending screws or worm spindles, illustrated as twelve in number, rotatably journalled at their outer ends in bearings 48 secured to the inner surface of wall 45, and at their inner ends in bearings 47 depending from the lower surface of disc 36 adjacent the periphery of the latter. A nut, or follower 49 threadedly engages each of the worm spindles 46, and is fixed to a radial slide 50, of inverted T-shaped cross-section, which slide is supported and radially guided by a suitable upwardly opening notch formed in the wall 45. Each of the slides 50 is pivotally connected at its outer end, as at 51, to the center of one of the flexible strips 41 forming the peripheral structure of the table top, and there are as many flexible strips 41 as there are worm spindles 46. The number of rods 37 is a multiple of the number of worm spindles 46, in the illustrated form a multiple of 12, so that an equal number of rods 37 will be disposed between each of the adjacent worm spindles. By reason of the connection of slides 50 to the flexible strips 41, rotation of the worm spindles 46, effecting radial movement of the associated slides, will result in radial movement of rods 37 in the area of the rotated spindles.

The drive for rotating the worm spindles 46 is so constructed as to be selectively capable of rotating all of the worm spindles at the same speed, in which case the several slides 50 will be moved radially at the same rate, or of rotating certain of the spindles 46 at one speed and others at one half that speed, in which latter case the several slides 50 will be moved radially at different rates for achieving irregular or non-circular contours for the table top. The drive for the worm spindles includes a hollow shaft 52 secured to the inner end of each of ten of the worm spindles 46 (Fig. 20) and formed with a longitudinally extending slot 53 (Fig. 19). The hollow shafts on the spindles indicated by letters C, F, I and L (Fig. 20) have pinions 54 and 55 rotatable thereon adjacent the outer and inner ends thereof. The remaining hollow shafts are each provided with a single rotatable pinion 54 adjacent the outer end thereof, and the two spindles A and B are provided with pinions 54 fixed to their inner ends.

A disc 56 is rotatably carried by sleeve 57 which is mounted upon center bolt 58. The rotatable disc 56 underlies the pinions 54 and 55 and is provided with two concentric series of spaced openings in which the teeth of pinions 54 and 55, respectively, mesh. In place of the openings formed in disc 56 for receiving the pinion teeth, disc 56 could be formed with two concentric series of gear teeth extending from the top surface thereof and meshing with the pinions 54 and 55.

In the illustrated form, diameter of the circle upon which inner series of openings are disposed, meshing with pinions 55, is one-half the diameter of the outer circle of openings meshing with pinions 54, so that the latter pinions are rotated at twice the speed of pinions 55. The speed at which the related worm spindle will be rotated depends on which of the pinions 54 or 55, in the case where the hollow shaft 52 has both pinions thereon, is fixed relative to the shaft for effecting rotation thereof. The coupling of the pinions 54 and 55 to the hollow shaft 52 is effected by a key 59 or a key 60 both carried by a longitudinally slidable rod 61 disposed within hollow shaft 52. The keys 59 and 60 extend through the slot 53 formed in shaft 52.

In order to effect longitudinal displacement of slidable rods 61, a strap or lug 63 is secured to the inner end of each rod 61, and links 62 are pivotally connected at one end to lugs 63 and at the other end to radially extending flanges 85 formed upon rotatable bushing 57 carried by central bolt 58. It is apparent that rods 61 will be disposed in their outermost positions when the links 62 are disposed radially, and that as bushing 57 is rotated in either direction the links 62 will pull rods 61 inwardly towards the center of the table. A lever arm 65 extends radially from the bottom of bushing 57 towards the outer edge of the table top and is provided with an operating knob 86 at its outer end. Swinging of knob 86 will control the positions of rods 61 and thereby determine which of the pinions 54 and 55 are locked to the respective shafts for rotating the related worm spindles 46.

The positions and lengths of keys 59 and 60, with respect to the lengths of the several rods 61, vary from rod to rod (Fig. 20), so that the movements of the respective rods 61 required for clutching or unclutching pinions 54 and 55 to the related shafts will vary from shaft to shaft. Therefore, a given angular displacement of actuating lever 65 and thus of bushing 57 may result in some of the spindles being driven by pinion 54 meshing with disc 56, some of the spindles being driven by pinion 55, and still others of the spindles being unaffected by reason of the idling of both pinions 54 and 55 on the related hollow shaft 52. The movement of slides 50 for extending or retracting the table top will thus depend upon the position of lever 65, and by varying the position of the latter and rotating disc 56 various shapes and dimensions can be given to the table top.

The mechanism for rotating disc 56 includes a hollow shaft 94 extending slidably over one of the worm spindles 46 (Fig. 19), and non-rotatably coupled to the latter by a key 87 engaging in slot 95 formed in the spindle. A crank 92 is pivoted at 93 to the outer end of hollow shaft 94, and when operative is disposed at right angles to the axis of the latter, as shown in broken lines, and the shaft 94 is pulled out so that the crank will clear the table edge when rotated. When inoperative, the shaft 94 is moved inwardly, and the crank 92 is folded under the table top. It is apparent that rotation of hollow shaft 94, keyed to one of the spindles 46, will effect rotation of disc 56 when either of the pinions 54 or 55 are keyed to the hollow shaft 52 being driven. The rotation of disc 56 will then effect rotation of all the other pinions meshed therewith.

Referring to Figure 20, it will be noted that on the spindles exclusive of A and B, only four spindles, C, F, I and L are provided with keys 59 and 60 and the remainder are provided with only keys 59. The keys are so positioned relative to the rods 61 upon which they are mounted that for each of four positions of lever 65 either pinion 54, or pinion 55 if there is one, or neither of the pinions will be coupled to the related hollow shaft 52, according to the shape of the table to be obtained. In the drawing, Fig. 20 thereof, the different positions of the groups of rods 37, represented merely for illustration are not correlated with the indicated positions of the keys 59 and 60. The keys in Fig. 20 are all shown in the position corresponding to a round table with all of the pinions 54 coupled to their respective shafts.

The following synoptic table indicates which of the pinions are coupled, on each of the spindles, for each of four positions of lever 65:

| Worm-Spindle | 1st position (circle) | 2nd position (half-circle and half-ellipse) | 3rd position (ellipse) | 4th position (curvilinear triangle) |
|---|---|---|---|---|
| A | 54 | 54 | 54 | 54 |
| B | 54 | 54 | 54 | 54 |
| C | 54 | 54 | 55 | 54 |
| D | 54 | 54 | none | 54 |
| E | 54 | 54 | none | 54 |
| F | 54 | 54 | 54 | 55 |
| G | 54 | 54 | 55 | none |
| H | 54 | 54 | 54 | none |
| I | 54 | 54 | 54 | none |
| J | 54 | 55 | 55 | none |
| K | 54 | none | none | none |
| L | 54 | 55 | 55 | 55 |

The keys 59, 60 are so arranged on rods 61 that with the lever 65 in the position shown in Fig. 20 all of the pinions 54 are engaged while the four pinions 55 are disengaged. If the original circumference of the table top is the circle defined by letters $a, b, c, d, e, f, g, h, i, j, k$, and $l$, of Fig. 26, and the disc 56 is rotated in the direction of the arrow on Fig. 20, all of the slides 50 will be simultaneously moved outwardly an equal distance so that the adjusted area of the table top will be increased, although remaining circular, and the new perimeter will be defined by letters $a_2, b_2, c_2 \ldots k_2$ and $l_2$ (Fig. 26).

Starting from the same reduced circular shape defined by $a, b, c \ldots k$, and $l$, and displacing lever 65 through an angle of 30° from the position shown in Fig. 20, pinions 54 on spindles A, B, C, D, E, F, G, and H will remain engaged, the remaining pinions 54 being disengaged, and pinions 55 only on spindles I and L will be engaged. Rotation of disc 56 will now result in the ends of the several spindles, still having engaged pinions 54, being moved to $a_2, b_2, c_2, d_2, e_2, f_2, g_2$ and $h_2$, while spindles I and L will move to positions $i_1$ and $l_1$, respectively, and spindles J and K, having no engaged pinions, will be immobile at $j$ and $k$. The table top will thereby be given a shape which is semi-circular on one side and semi-elliptical on the other side.

If the lever 65 is displaced 60°, from the position shown in Fig. 20, and the disc 56 subsequently rotated, only those pinions 54 on spindles A, B, G and H and those pinions 55 on spindles C, F, I and L will be engaged to their respective shafts. The table top would then assume a perimeter defined by letters $a_2, b_2, c_1, d, e, f_1, g_2, h_1, i, j, k$ and $l_1$, which letters define a complete ellipse.

Finally, if the lever is displaced 90° from the position of Fig. 20, only those pinions 54 on spindles A, B and E, and those pinions 55 on spindles C, F, I and L will be engaged. Rotation of disc 56 will then effect the movement of certain of the slides 50 to obtain the outline defined by $a_2, b_2, c_2, d_2, e_2, f_1, g, h, i, j, k$ and $l_1$ that is a shape approximating a right angle triangle with curved sides.

It will be understood that the number of spindles 46 is not limited to the number shown, and that the positions of the coupling keys may be varied as well to obtain other combinations for providing other table outlines.

With the embodiment shown, it is desirable that the table top be returned to the reduced diameter circular form prior to actuating lever 65 for changing the positions of the keys 59 and 60. To return the table top to this preferred starting position disc 56 is rotated in the direction opposed to the arrow of Fig. 20.

In order to prevent actuation of lever 65, when the top is in a condition other than that of the reduced diameter circular form, a stud 66 projects downwardly from lever 65 and is received in a selected one of the openings 67 formed in the fixed lower wall of the table top structure. The openings 67 are disposed at positions corresponding with each of the 30° spaced apart operative positions of lever 65 and prevent actuation of the latter unless the lever may be lifted to remove stud 66 from the opening 67 in which it is engaged. To prevent lifting of lever 65 when the table is not in its minimum diameter circular condition, a vertical pin 68 is slidably carried by a suitable frame fixed adjacent each of the spindles C, A, B and L and underlies a flange of the slide 50, actuated by such worm spindle (Fig. 21). The pin 68 is constantly urged downwardly to a position abutting the top surface of lever 65 by spring 70 and is prevented from moving upwardly by the flange of guide 50 whenever the guide is extended. An opening 69 is formed in the flange of guide 50 (Fig. 19) and registers with pin 68 when the guide is in its fully retracted position to receive pin 68 and permit upward movement of lever 65 against the force of spring 70.

The table top described, and illustrated in Figures 17-26, is also vertically adjustable, by reason of the construction of the supporting base. The supporting base includes four lower leg portions 72 having right angled brace members 75 extending therebetween. Four upper leg portions 71 are fixed at their upper ends to the lower circular disc 44 of the table top structure and are cross-braced by members 74 which are vertically aligned with bracing members 75. A housing 76 cross-shaped in horizontal section is provided with a top wall 83 through which the upper leg portions 71 slidably project, and a side skirt which extends downwardly over the lower leg portions 72.

Suitable means are provided for moving the upper leg portions, and hence the table top structure, upwardly and downwardly relative to the lower part of the supporting base formed by leg portions 72 and bracing 75. The preferred means illustrated includes toggle joints 73 interposed between each leg of the cross-bracing 74 and the underlying leg of cross bracing 75. The toggle joints 73 are adjusted in their height by the rotation of horizontal worm spindles 77, each having a pair of oppositely threaded portions, and carrying nuts 78 arranged at the lateral pivots of the joint. The spindles 77 are rotatably journalled at their outer ends in bearings 79 carried by the skirt of housing 76 and at their inner ends in a frame 80 at the center of the base. The four right angularly related spindles 77 are connected for simultaneous rotation by the meshing bevel gears 81 fixed to their inner ends. One of the spindles 77 is provided with an operating crank 82 hinged to its outer end which may be rotated to effect the raising or lowering of the table top.

Having thus described and illustrated several specific embodiments of the invention, it is to be understood that changes and modifications therein, obvious to those skilled in the art, may be effected without departing from the scope of the invention as defined in the appended claims.

What I claim as my invention and desire to secure by Letters Patent is:

1. An extensible table comprising an indeformable central portion, an annular portion composed of radially movable elements, actuating members sustained by said central portion, radially movable with respect to said central portion and connected with the rim of said annular portion, transmission means adapted to move said actuating members radially and an operating member for said transmission means, said transmission means being characterized in that they comprise coupling members interposed between said operating member and the related actuating members and means to render said coupling members operative as desired, with the result that the radially movable members are displaced by unequal amount in accordance with the table outline to be obtained.

2. An extensible table according to claim 1 wherein the said actuating members comprise radially arranged rotatable worm spindles, a non-rotatable nut on each worm spindle, connected with a group of radially movable elements in combination with idle pinions mounted on each worm spindle, wherein the operative member for the transmission means comprises a disc formed with a double set of teeth, each set permanently meshing with at most one of the pinions mounted on each worm spindle, and means adapted to rotate said disc as desired, and wherein the transmission means comprise coupling members slidable coaxially with said spindles adapted to couple each spindle with either pinion carried thereby or with none of them depending on the position of said members and means to simultaneously displace said coupling members, said screw spindle coupling members being so designed that said spindles can be coupled with the pinions according to various combinations, thus bringing about various deformations of the table outline as the double gear disc is rotated.

3. An extensible table according to claim 1 wherein the radially movable elements consist of slidable bars arranged radially interconnected at their inner ends by flexible strips, lugs pivoted to the outer ends of said bars and an extensible tie connecting said lugs with one another and connected at intervals to the actuating means of the radially movable elements.

4. An extensible table according to claim 1 wherein the actuating means of the radially movable elements comprise radially arranged rotatable and axially unmovable worm spindles, axially movable non-rotatable nuts on said worm spindles, while the operating member consists in a hollow shaft slidably mounted on and splined with one of said spindles, in combination with a crank pivoted to one end of said hollow shaft and with means to transmit the rotation of said worm spindle to the other worm spindles with variable gear-ratios, said means comprising idle pinions mounted on said worm spindles, a disc with several sets of teeth, each set of teeth being in permanent meshing engagement with at most one of the pinions mounted on each worm spindle, movable members adapted to couple said pinions with the relative worm spindles and means to displace said movable members according to various combinations.

ARTUR MEGIÈS.

REFERENCES CITED

The following references are of record in the file of this patent:

UNITED STATES PATENTS

| Number | Name | Date |
|---|---|---|
| 606,084 | Poupon | June 21, 1898 |

FOREIGN PATENTS

| Number | Country | Date |
|---|---|---|
| 849,989 | France | Dec. 5, 1939 |